Figure 1:
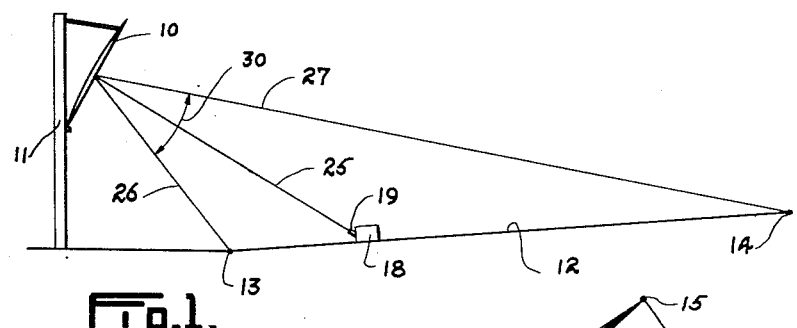

Sept. 18, 1956  J. G. JACKSON  2,763,184
PROJECTION SCREENS
Filed June 23, 1952  3 Sheets-Sheet 1

INVENTOR
JAMES GORDON JACKSON
BY
Fetherstonhaugh & Co.
ATTORNEYS

Sept. 18, 1956  J. G. JACKSON  2,763,184
PROJECTION SCREENS
Filed June 23, 1952  3 Sheets-Sheet 2

INVENTOR
JAMES GORDON JACKSON
BY
Featherstonhaugh & Co.
ATTORNEYS

Sept. 18, 1956    J. G. JACKSON    2,763,184
PROJECTION SCREENS
Filed June 23, 1952    3 Sheets-Sheet 3

INVENTOR
JAMES GORDON JACKSON
BY
Fetherstonhaugh & Co.
ATTORNEYS

United States Patent Office 2,763,184
Patented Sept. 18, 1956

2,763,184
PROJECTION SCREENS

James Gordon Jackson, Port Alberni, British Columbia, Canada

Application June 23, 1952, Serial No. 295,083

4 Claims. (Cl. 88—28.9)

This invention relates to improvements in picture projection screens.

The invention is particularly applicable to very large screens used in outdoor theatres, but it is to be understood that it may be adapted for screens for other purposes.

At the present time, drive-in theatres cannot function in full daylight. They usually start to operate as early as possible in the evening, but this is made difficult by light from the horizon striking the screen and being reflected back into the audience area.

The main purpose of this invention is the provision of a projection screen which will reflect most of the projected rays into the audience area only. This eliminates practically all waste of light which occurs when rays from the projector are reflected outside the audience area, as is the case with the screens now in common use. As a result of this concentration of the projected rays, the screen may be used in full daylight without any difficulty. The screen is designed to direct light from the sky to the ground between the front edge of the audience area and the screen. Thus, such light does not reach the audience area and, therefore, does not interfere with the reflection of the projected picture.

A screen according to the present invention has a substantially spherical concave reflecting surface facing the audience area. The screen is raised high enough to be clearly seen from any position in the area. As is usual in outdoor theatres, the projector is located in the audience area near the front thereof. It has been found that the best results are obtained by using a curve for the screen having a radius longer than the projection distance, that is, the distance between the projector and the centre of the screen. It is preferable to position the screen relative to the audience area in such a way that the projector is located on the central axis of the screen, although the projector may be a little above this axis.

The curved reflecting surface of the screen is provided with a plurality of individual curved reflectors small enough to be beyond the visual resolving power of the eye at any point in the audience area. The centre of the vertical curve of each reflector is the point where the normals from the top and bottom edges thereof cross, and the angle between these normals is approximately equal to one-half of the angle between the opposite ends of the audience area and the centre of the reflector. It is desirable to curve each reflector laterally as well as vertically. The centre of the lateral curve of each reflector is the point where the normals from opposite sides thereof cross, and the angle between said side normals is approximately equal to one-half of the angle between lines from the centre of the reflector to the sides of the audience area at the maximum width thereof. Furthermore, it is preferable to make the central axis of each reflector coincide with a radius of the screen curve.

The image projected on the screen is formed by a glare spot from each reflector, but when it is viewed at a distance, it appears as a solid image. For best results, each reflector should be formed in the manner set out above. However, this may not be practical, in which case the size and curves of the reflectors for the top of the screen may be determined and all other reflectors made the same. This will cause the reflectors at the bottom of the screen to waste a little light, but this would be such a small percentage that it would not interfere with the proper functioning of the screen.

Figure 2:
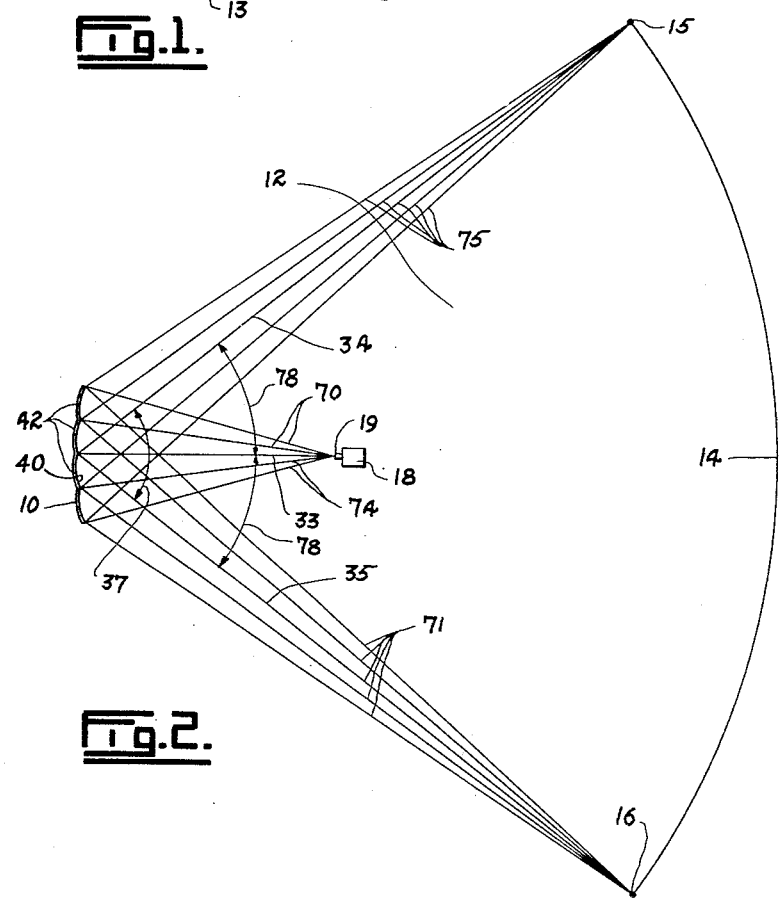
Figures 3, 4:
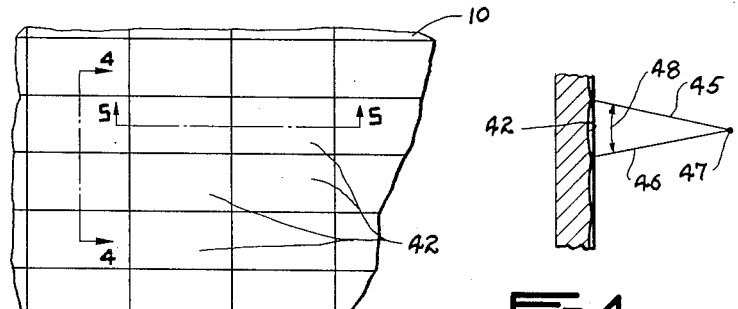
Figure 5:
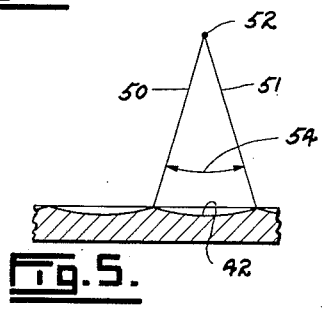
Figure 6:
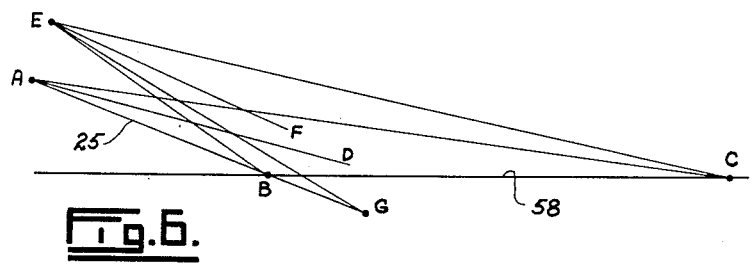
Figure 7:
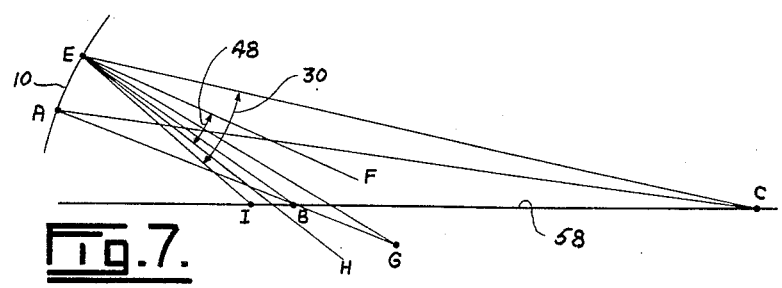
Figure 8:
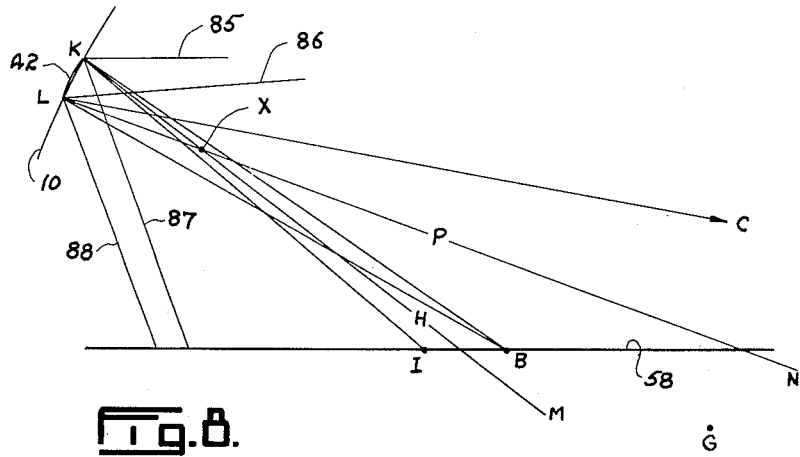
Figure 9:
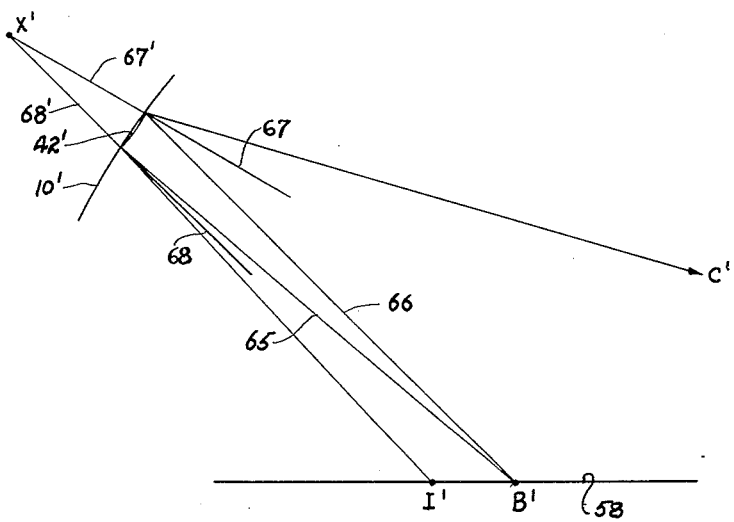

An example of this invention is illustrated in the accompanying drawings, in which, Figure 1 is a diagrammatic side view of a theatre using this projection screen, Figure 2 is a diagrammatic plan view of the theatre, Figure 3 is an enlarged front view of a portion of the screen, Figure 4 is a vertical section taken on the line 4—4 of Figure 3, Figure 5 is a horizontal section taken on the line 5—5 of Figure 3, Figure 6 is a diagram showing how to locate the centre of the screen, Figure 7 is a diagram showing how to locate the upper and lower normals of a reflector at the top of the screen, Figure 8 is a diagram illustrating how light from an upper reflector covers the audience area, and Figure 9 is a view similar to Figure 8 showing a convex reflector.

Referring to Figures 1 and 2 of the drawings, 10 is a projection screen mounted in any suitable manner upon a supporting framework 11. This screen has a concave substantially spherical reflecting surface with a plurality of concave or convex curved individual reflectors in said surface. The audience area is represented at 12, said area extending from the front 13 to the back 14 thereof. This may be an inclined surface divided into ramps as is usual in outdoor theatres. Points 15 and 16, see Figure 2, indicate the maximum width of the audience area. A projection room 18 is provided in the audience area near the front thereof, and 19 represents the lens of the projector in this room.

In Figure 1, 25 is a beam of light from the projector lens to the centre of the screen 10, and 26 and 27 are the reflected rays to the front 13 and back 14, respectively, of the audience area. The angle indicated at 30 is hereinafter referred to as the vertical angle of the audience area.

Figure 2 is a plan view of the theatre, and 33 is a beam of light from the projector to the centre of the screen, and 34 and 35 are the reflected rays to the points 15 and 16 at the maximum width of the audience area. The angle represented by the numeral 37 is hereinafter referred to as the lateral angle of the audience area.

As previously stated, the reflecting surface 40 of the screen 10 is concave and substantially spherical in shape. This surface is made up of a plurality of individual reflectors 42. These reflectors are preferably concave, as shown in Figures 3 to 5, but they may be convex. The surface of each reflector is substantially spherical, but the width is usually greater than the height thereof. As these reflectors form part of a spherical surface, the edges thereof are curved, but the reflectors are so small in relation to the full size of the screen that these curves are negligible. The reflectors must be small enough to be beyond the visual resolving power of the eye at any point in the audience area 12. As an example of the relative sizes of the screen and reflectors, in a screen sixteen feet wide, the reflectors may be around one-half inch wide.

In Figure 4, 45 and 46 are the normals from the top and bottom edges of a reflector 42, and 47 in the centre of the vertical curve of the reflector. The angle between these normals and indicated at 48 is known as the vertical angle of the reflector.

In Figure 5, 50 and 51 are the normals from the opposite sides of a reflector 42, and 52 is the centre of the lateral curve of said reflector. The angle between these normals and indicated at 54 is known as the lateral angle of the reflector.

The vertical angle 48 of each reflector is approximately equal to one-half of the vertical angle 30 of the audience area, and the lateral angle 54 of each reflector is approximately equal to one-half of the lateral angle 37 of the audience area. With these angles, practically all of the light reflected by the reflectors is directed into the audience area. As previously stated, the angles are calculated for the reflectors at the top of the screen so that the reflectors at the bottom thereof direct some light into the space between the front of the audience area and the screen. It is possible to design the lower reflectors to direct all light into the audience area, but this would make it very difficult to construct a screen, and it may even cause the lower part of the screen to be brighter than the rest of it. For all practical purposes, the reflectors may all be made the same.

In Figure 1, the beam of light 25 is the projection distance from the lens 19 to the centre of the screen. For the best results, the radius of the screen should be longer than the projection distance 25.

Figure 6 diagrammatically illustrates one way of locating the centre of the screen. In constructing this figure, a line 58 is drawn representing the ground which, for the purpose of this calculation, may be considered to be level. The screen is to be raised above the ground to a point where it may easily be seen from any point in the audience area. In this calculation, A represents the centre of the screen at any desired point above the ground level, and B represents the projector lens at the ground level. Line AB is drawn and produced beyond B. AB is the central screen normal as well as the projected ray 25. C represents the back of the audience area. For the purpose of this calculation, the point A is considered to be the lower edge of a reflector 42. AC is drawn to represent the reflected beam from the lower edge of the reflector to the back of the audience area at C. Angle BAC is now bisected and the normal AD is drawn for the lower edge of the reflector. Since AB is normal to the screen and AD is normal to the lower edge of the reflector, the relationship between the two normals is established, and this relationship is fixed for all the reflectors of the screen.

The next step is to locate the point E at the top of the screen on a line substantially at right angles to the screen normal AB, and BE is drawn to represent a projected ray from the projector lens. EC is now drawn and this represents the reflection of this ray to the back of the audience area. Point E also is the lower edge of a reflector. Angle BEC is bisected and EF is drawn as the normal to the lower edge of the reflector. As the normal of the screen to the point E has a definite relationship to the normal EF, it is now possible to locate the screen normal to this point. EG is drawn with the angle FEG equal to angle BAD. G is the point where the new screen normal crosses the central screen normal AB. The point G is the centre of curvature of the screen 10. The distance AG is greater than the distance AB, and the relationship between these distances varies with variations in the audience area lengths.

Figure 7 illustrates a method of finding the vertical curve of the reflectors. In this figure, A is the central point of the screen 10, B the projection lens, and G the centre of curvature of the screen. E represents a reflector at the top of the screen. As the reflector is so small relative to the screen, it is considered a point for the purpose of this calculation. BE is a projected ray and EC the reflected ray therefrom to the point C at the back of the audience area. Angle BEC is bisected and the normal EF drawn, said line being the normal to the lower edge of the reflector. EG is drawn as the screen normal at the lower edge of the reflector. Angle GEF is the angle between the screen normal at the lower edge of the reflector, and the reflector normal at said lower edge. The angle between the screen normal at the upper edge of the reflector and the reflector normal to said upper edge must equal angle GEF. This new angle must be below screen normal EG. Angle GEH is drawn equal to angle GEF, so that EH is the normal from the upper edge of the reflector. Angle HEI is drawn equal to angle BEH. The point I on the ground level 58 is the front of the audience area so that the latter extends between the points I and C. Angle IEC is actually the vertical angle 30 of the audience area, while angle HEF is the vertical angle 48 of the reflector. It will be found that angle 48 is approximately equal to one-half of the angle 30.

Figure 8 diagrammatically illustrates how light projected on to a reflector 42 at the top of the screen 10 is directed back into the audience area. In this diagram, K and L are the upper and lower edges of a reflector 42 at the top of the screen 10. BK is a beam projected to the upper edge of the reflector, and KI is a reflected ray to the front of the audience area. KH is the normal to the upper edge of the reflector. Similarly, BL is a ray projected to the lower edge of the reflector, and LC the reflected ray to the back of the audience area. LP is the normal to the lower edge of the reflector, and the point X where LP and KH cross is the centre of curvature of the reflector. KH has been produced to M and LP to N. Angle LXK equals angle MXN. Thus, angle MXN equals the vertical angle of the reflector which is approximately equal to one-half of the vertical angle of the audience area. From this it will be seen that all light reflected by the reflector 42 falls in the audience area.

Figure 9 illustrates a screen 10' having a convex reflector 42' at the upper edge thereof. This reflector functions in the same manner as the concave reflector 42 excepting that the beam 65 from B' to the lower edge of the reflector is directed back to the point I' at the front of the audience area, while beam 66 to the upper edge of the reflector is directed back to the point C' at the back of the audience area. The normals to the upper and lower edges of the reflector are represented at 67 and 68, and these have been produced behind the reflector at 67' and 68', respectively, to cross at X', the centre of curvature of the reflector. The vertical angle of the reflector between these normals is approximately equal to one-half of the vertical angle of the audience area.

Figure 2 diagrammatically illustrates four reflectors 42 arranged horizontally at the centre of the screen 10. Beams 70 from the projector lens 19 to the right sides of the reflectors are directed back along lines 71 which meet at the point 16 at the maximum width of the audience area. Similarly, beams 74 to the left sides of the reflectors are directed along lines 75 to the point 15 at the maximum width of the audience area. It will be noted that lines 34 and 35 previously referred to coincide respectively with one of each of the lines 75 and 71. Each projected beam to a point of juncture of two reflectors is directed partly to the point 15 and partly to the point 16, and therefore, the angle between point 15 and the point of juncture of any two reflectors and the point 16 is equal to the lateral angle 37 of the audience area. Each of the angles between line 33 and each of the lines 34 and 35 is equal to one-half of the lateral angle 37 of the audience area.

Referring again to Figure 8, 85 and 86 represent rays of light from the horizon to the upper and lower edges of the reflector 42. Reflected rays 87 and 88 are directed downwardly into the area between the screen 10 and the front I of the audience area. Thus it will be seen that any light from the sky is reflected downwardly so that it does not reach the audience area and, consequently, it cannot interfere with the images reflected by the screen.

What I claim as my invention is:

1. In a projection screen for an audience area, a plurality of individual laterally and vertically curved reflectors small enough to be beyond the visual resolving power of the eye at any point in the audience area, the centre of the vertical curve of each reflector being the point where the normals from the top and bottom edges thereof cross, and the vertical angle between said normals being approximately equal to one half of the vertical angle between the opposite ends of the audience area and the centre of the reflector, and the centre of the lateral curve of each reflector being the point where the normals from opposite sides thereof cross, and the lateral angle between said side normals being approximately equal to one half of the lateral angle between lines from the centre of the reflector to the sides of the audience area at the maximum width thereof.

2. A projection screen as claimed in claim 1 in which the reflecting surface of each reflector is concave.

3. A projection screen as claimed in claim 1 in which the reflecting surface of each reflector is convex.

4. A projection screen for an audience area having a picture projector therein, said screen having a generally spherical reflecting surface which is curved laterally and vertically and is made up of a plurality of individual laterally and vertically curved reflectors small enough to be beyond the visual resolving power of the eye at any point in the audience area, the radius of the screen curve being longer than the projection distance and the central axis of said screen extending substantially through a projector used with the screen, the central axis of each individual reflector coinciding with a radius of the screen, the centres of the vertical curve and of the lateral curve of each reflector being respectively the point where the normals from the top and bottom edges thereof cross and the point where the normals from the opposite sides thereof cross, the vertical angle between said top and bottom normals is approximately equal to one half of the vertical angle between the opposite ends of the audience area and the centre of the above-mentioned reflector, and the lateral angle between said side normals is approximately equal to one half of the lateral angle between lines from the centre of said last-mentioned reflector to the sides of the audience area at the maximum width thereof.

References Cited in the file of this patent

UNITED STATES PATENTS

| 1,122,192 | Clark | Dec. 22, 1914 |
| 1,279,262 | Clark | Sept. 17, 1918 |
| 1,550,880 | Clark | Aug. 25, 1925 |
| 2,273,074 | Waller | Feb. 17, 1942 |
| 2,381,614 | Moller et al. | Aug. 7, 1945 |
| 2,552,455 | Pond | May 8, 1951 |

FOREIGN PATENTS

| 960,528 | France | Oct. 31, 1949 |

OTHER REFERENCES

"An Experimental Large-Screen Television Projector," by P. Mandel; reprinted from the Proceedings of the I. R. E., vol. 37, No. 12, pages 1466–1467, December 1949.